UNITED STATES PATENT OFFICE.

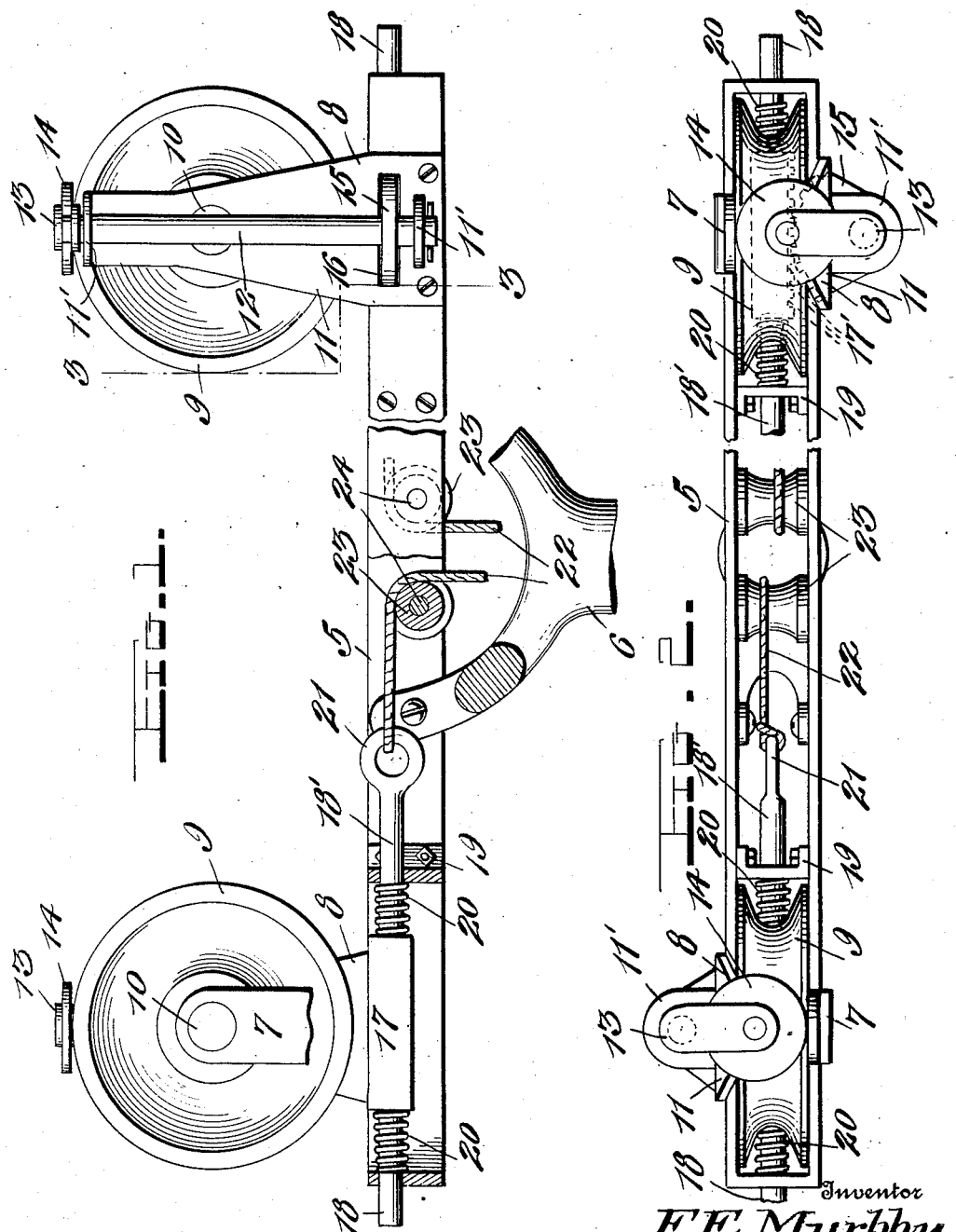

FRANK E. MURPHY, OF LINCOLN, ILLINOIS.

TROLLEY-HARP.

1,016,430. Specification of Letters Patent. Patented Feb. 6, 1912.

Application filed February 27, 1911. Serial No. 611,011.

*To all whom it may concern:*

Be it known that I, FRANK E. MURPHY, a citizen of the United States, residing at Lincoln, in the county of Logan and State of Illinois, have invented certain new and useful Improvements in Trolley-Harps, of which the following is a specification, reference being had to the accompanying drawings.

This invention relates to improvements in trolley harps and has for its primary object to provide a simple and novel device of this character whereby the trolley wire is retained in engagement with the wheels of the harp.

Another object of the invention is to provide a double wheeled trolley harp, guard devices movable over the wheels and the trolley wire which is arranged therein, and novel mechanism for operating said guards to remove the harp from the wire.

A still further object of the invention is to provide a device of the above character consisting of a frame having a wire engaging wheel mounted upon each end thereof, a movable guard device arranged adjacent to each wheel and normally disposed over the wire, and means mounted in each end of the frame adapted to be actuated by suitable operating cords for operating the guard devices to disengage the wheels from the trolley wire.

With the above and other objects in view, the invention consists of the novel features of construction, combination and arrangement of parts hereinafter fully described and claimed, and illustrated in the accompanying drawings, in which—

Figure 1 is a side elevation partly in section of a trolley harp embodying my improvements; Fig. 2 is a top plan view thereof.

Referring in detail to the drawings 5 designates the body of my improved trolley harp which is in the form of an elongated substantially rectangular frame. This frame is preferably constructed of a single bar of steel and the trolley pole 6 is centrally secured to the parallel longitudinal bars of the frame in any desired manner. Upon each end of the rectangular frame 5 and to opposite sides thereof, a vertical supporting bar 7 is secured. To the opposite sides of the frame 5, a similar bar 8 is rigidly secured at its lower end. Between the upper ends of these bars the trolley wheels 9 are mounted to rotate upon the axles 10 which are rigidly fixed at their ends in the vertical supports. These trolley wheels are of any ordinary or approved construction and are provided with the usual annular wire receiving grooves in which the trolley wire W is disposed. The upper portions 11 of the bars 8 extend above the upper ends of the opposed supporting bars 7. The upper and lower ends of the bar 8 are disposed at an angle to said bar and in parallel relation to each other as indicated at 11'. The lower or base portion of the bar 8 is considerably wider than the upper portion thereof and the portion 11' is formed thereon as an extension of the base. It will be obvious, however, that the parallel portions 11' may be separately formed and rigidly secured to the upper and lower ends of the upright or supporting bar 8 in any preferred manner. The parallel ends 11' of the bar 8 extend transversely with relation to the frame 5, and in these parallel ends of the supporting bar the guard devices are mounted. These guard devices are each identical in form, and the description of one will therefore suffice for both. The guard consists of a cylindrical rod 12 which is disposed through and rotates in the parallel end portions 11' of the bar 8. A laterally extending arm 13 is integrally formed upon the upper end of said rod and has mounted upon its extremity and disposed in a horizontal plane, the guard wheel 14. This wheel in the normal position of the device is disposed over the trolley wire located in the groove of the wheel 9. This wheel is loosely mounted on the end of the arm 13 and freely rotates when engaged by the trolley wire. Thus wear upon the under face of the wheel is equally distributed over the same and the durability of the device materially increased. A sector plate 15 is rigidly fixed upon the cylindrical rod 12 adjacent to its lower end and immediately above the lower transverse plate 11' of the bar 8. The supporting bar 8 and the longitudinal bar of the frame 5 upon which said bar is mounted are provided with the alined openings 16 through which the sector plate 15 extends. This sector plate has formed upon its arcuate edge the teeth 15' which mesh with the teeth 17' of a rack bar 17 mounted for longitudinal movement between the parallel longitudinal bars of the frame 5. The intermediate portion of the rack bar upon which the teeth 17' are formed is of substantially rectangular shape, and beyond said rectangular portion the rack bar is reduced to provide the cylindrical guide rods 18 and 18' respectively. One of these guide rods is movable through an opening in the end of the frame 5, and the other guide rod 18' is similarly disposed through an opening in the plate 19 which is rigidly fixed at its ends to the longitudinal bars of the frame. Coiled springs 20 are arranged upon the guide rods 18 and 18' between the opposite ends of the intermediate toothed portions of the rack bar and the end of the frame 5 and the plate 19. These springs normally act to maintain the central portions of the teeth of the sector plate 15 and the teeth of the rack bar 17 in engagement so that the rod 12 of the guard may be rotated to a sufficient extent to dispose the wheel on the arm 13 thereof to one side of the trolley wire whereby the harp may be disengaged from the wire. The guide rod 18' has an eye 21 formed in its end to which the end of an operating cord or cable 22 is connected. This operating cord moves over a guide roller 23 mounted upon a shaft 24 fixed at its ends in the longitudinal side bars of the frame 5. The operating cords, one of which extends to each of the guard actuating devices may be disposed through suitable guides on the trolley pole.

The operation of the device in practical use will be obvious from a perusal of the drawings. When it is desired to release the harp from the trolley wire, the operator simply pulls upon the cords 22, and moves the rack bars 17 longitudinally in the frame 5 against the tension of the coiled springs 20. This movement of the rack bar rotates the rods 12 of the guards through the medium of the sector plates 15 which are rigidly fixed thereto, thereby swinging the arms on the upper ends of said rods outwardly to dispose the wheels mounted thereon out of the plane of the trolley wire W. Upon the release of the operating cords 22, after the wheels 9 have again been engaged upon the wire, the guards will immediately return to their normal positions over the wire and retain the same upon the trolley wheels. In this manner the wire is at all times held in close engagement with the trolley wheels so that the electric current is properly conducted to the controllers of the car.

From the foregoing description taken in connection with the accompanying drawings, it is believed that the construction and operation of my improved trolley harp will be readily understood.

The guard means for retaining the trolley wire upon the wheels is comparatively simple in construction and may be easily and quickly operated to instantly release the harp from the wire.

While I have shown and described the preferred form of the main frame 5 upon which the parts are mounted, it will be obvious that this frame may be of various other forms without departing from the essential feature of the invention. Many other modifications may also be resorted to in the practical development of the invention, without departing from the spirit or sacrificing any of the advantages of the invention.

Having thus described the invention what is claimed is:—

1. A trolley harp comprising an elongated rectangular frame, supports rigidly fixed upon said frame, a trolley wheel revolubly mounted in said supports, a guard device comprising a rod rotatably mounted upon one of the supports, a wheel rotatable upon the upper end of the rod and normally disposed in a horizontal plane above the trolley wire, said frame and the support having an opening therein, a toothed sector plate rigidly fixed to said rod and extending through said opening, a spring held longitudinally movable rack bar mounted between the parallel sides of the frame and engaged with the teeth of the sector plate, a guide roller mounted between the side bars of the frame, and an operating cord passing over said roller and connected to one end of the rack bar whereby said bar may be moved to rotate said rod and dispose the guard wheel at one side of the trolley wire to disengage the trolley wheel from the wire.

2. A trolley harp comprising a rectangular frame, supports rigidly fixed to the side bars of said frame, a trolley wheel revolubly mounted in said supports, the upper and lower ends of one of said supports being disposed at right angles and transverse with relation to the frame to form bearings, a guard device comprising a rod rotatably mounted in said bearings, a wheel rotatable upon the upper end of the rod and normally disposed in a horizontal plane over the trolley wire, a toothed sector rigidly fixed to said rod, one side of the frame having an opening therein through which said sector extends, a cross bar connecting the longitudinal side bars of the frame, a spring held rack bar slidably mounted in said connecting bar and in one end of the frame, the teeth of said rack bar having engagement with the teeth of the sector, a pulley mounted between the side bars of the frame, and an operating cord passing over said pulley and connected to one end of said rack bar.

In testimony whereof I hereunto affix my signature in the presence of two witnesses.

FRANK E. MURPHY.

Witnesses:
 JOHN MILBURN,
 A. L. WALLACE.

Copies of this patent may be obtained for five cents each, by addressing the "Commissioner of Patents, Washington, D. C."